United States Patent [19]

Chang

[11] 3,777,186

[45] Dec. 4, 1973

[54] CHARGE TRANSFER LOGIC DEVICE

[75] Inventor: Wen H. Chang, Essex Junction, Vt.

[73] Assignee: International Business Machines Corporation, Armonk, N.Y.

[22] Filed: July 3, 1972

[21] Appl. No.: 268,415

[52] U.S. Cl. .......... 307/304, 317/235 R, 317/235 G
[51] Int. Cl. .......... H01d 11/14
[58] Field of Search .......... 317/235 G; 307/304

[56] References Cited

OTHER PUBLICATIONS

IBM Tech. Discl. Bul., "Random Acess Potential Ramp Memory for Charge–Coupled Devices" by Heller et al. Vol. 14, No. 2, July 1971 pages 485–486.

1971 IEEE International Solid State Conf., "A Simple Charge Regenerator" by Tompsett, Feb. 19, 1971 pages 160–161.

*Primary Examiner*—Jerry D. Craig
*Attorney*—H. J. Walter, Jr. et al.

[57] ABSTRACT

A monolithic charge transfer device wherein logic functions are performed is disclosed. A logical AND gate is provided which utilizes a quantized potential well formed in a surface region of a semi-conducting, or semi-insulating, material by a pattern of control electrodes. Various applications of the AND gate structure provide additional logical functions of Exclusive OR and Exclusive NOR gates.

13 Claims, 25 Drawing Figures

CHARGE TRANSFER LOGIC DEVICE

BACKGROUND OF THE INVENTION

1. Field of the Invention

This invention relates to logic devices and more particularly to devices capable of performing logical functions compatible with charge transfer, or charge-coupled, device structures.

2. Description of the Prior Art

Charge-coupled, or charge transfer devices rely on the ability of a packet of charge to be selectively transferred in depletion regions created near the surface of a semi-conducting, or semi-insulating, body. These devices have been described by various authors including: Boyle et al, "Charged-Coupled Semiconductor Devices," Bell System Tech. J., Vol. 49, page 587, (1970); Engeler et al., "A Memory System Based on Surface Charge Transport," IEEE J. of Solid State Circuits, Vol. SC-6, page 306 (1971) and Tompsette, "A Simple Charge Regenerator . . . and Design of Functional Logic Arrays," 1971 IEEE ISSCC Digest of Technical Papers, page 160 (Feb. 19, 1971). Basically, these devices operate on the principal that small quantities of charge carriers may be temporarily stored in a depletion region potential well created at the surface of a storage medium by the well known field effect or other potential well producing phenomena. By varying the intensity of separate wells adjacent to each other charges may be controllably moved across the surface of a substrate. Various applications of these charge-coupled devices have been suggested and include primarily dynamic configurations, i.e., shift registers, as opposed to static configurations, i.e., flip-flops, due to the transitory nature of the charges transferred in these devices. Certain elementary logical functions are capable of being performed by the basic diffusionless charge-coupled structure. For example, a logical OR function may be achieved by a fan-in structure without the aid of additional diffusions. Additional logical functions including NOR and NAND are taught by the last of the above mentioned references, but may be achieved only at the expense of providing regeneration, or charge injection, configuration requiring the use of additional diffusions. These devices also provide inverted outputs which may be undesirable in some situations. That is, if under normal operations the presence of a charge represents a logical 1 prior to being passed through the logic structure, the absence of a charge will represent a 1 on the output of the logic device.

SUMMARY OF THE INVENTION

The instant invention overcomes some of the problems presented by the prior art charge-coupled logic devices by providing a basic structure capable of performing a logical AND function on two, or more, simultaneous, or nearly simultaneous, input pulses without the necessity of additional diffusions and without inverting the form of the data. The AND function is achieved by providing a first potential well, or depletion region, having a fixed charge capacity equal to about $n-1$ times a unit charge. The charge capacity of a first potential well is adjusted by controlling the potential on one side of the well such that if all $n$ charges are supplied within the same time frame to the first potential well one charge quantity will "overflow" into a second potential well thereby providing the AND function. Various combinations of the basic AND gate are also used to provide Exclusive OR and Exclusive NOR functions. Proper selection of electrode patterns and voltage phasing allows the structures to be compatible with other known charge-coupled devices.

It is therefore an object of this invention to provide a logical AND function for charge-coupled devices without the use of regenerative structures.

Another object is to provide charge coupled device logic compatible with other functional charge coupled device structures.

These and other objects, features and advantages of the invention will be apparent from the following more particular description of the preferred embodiments of the invention as illustrated in the accompanying drawings.

DETAILED DESCRIPTION

With respect to the following description, it will be appreciated that for simplicity and clarity of explanation various figures have not necessarily been drawn to scale. Additionally, some well known design details related to efficient operation of known charge-coupled devices have been omitted. Reference numerials have been repeated from figure to figure where appropriate to indicate corresponding elements of the different embodiments.

In charge-coupled devices, digital information is represented by the presence or absence of a packet of charge carriers localized in, and electrostatically coupled to, artificially induced potential minima or potential wells normally formed adjacent to a surface of a suitable storage medium. Usually the potential wells are formed and controlled by application of voltages to field plate electrodes of the type used in the well known metal-insulator-semiconductor (MIS) technologies. Since both MIS devices and charge-coupled devices are well known and adequately described in available literature, as previously cited above, the details of their operation need not be discussed herein. To the extent that the previously cited prior art references may be necessary to supplement the following disclosure, they are hereby incorporated by reference.

Figure 1:
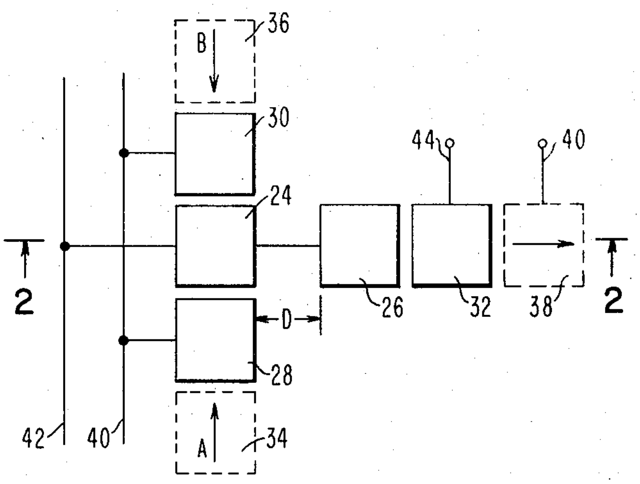
FIG. 1 is a schematic plan view of one embodiment of the invention showing the surface electrode pattern, including the spacing between electrodes used to provide the logical AND function.

Referring now to FIGS. 1 and 2 there is shown one embodiment of the instant invention for performing the logical AND function utilizing positive logic. There is provided a storage medium, such as *n*-type semiconductor substrate 20, having a thin insulating layer 22 adjacent to one surface of the substrate. overlying insulating layer 22 are a pair of field electrodes 24 and 26 electrically connected, but physically separated by a predetermined distance D. As will be described below, electrodes 24 and 26 and the distance D act as a first potential inducing means and cooperate to create a surface potential profile, or potential well, suitable for performing the logical AND function. Additional surface electrodes are also provided and may be stages of, for example, three phase charge-coupled device shift registers acting as both input and output for the logic gate. Electrodes 28 and 30, respectively, provide the inputs A and B to the AND gate and may be the last stage of, for example, a three phase charge-coupled device shift register. Electrode 32 represents the output of the AND gate and may be the input to a charge-coupled device shift register, logic device, charge sensor or other circuit device. Additional electrodes 34, 36 and 38, shown in phantom outline, represent additional electrodes of input and output devices and are shown for convenience in understanding the invention.

Various clock pulse, or phase, lines are electrically connected to each electrode as shown. These lines are arbitrarily designed in FIGS. 1 and 2 as 40, 42 and 44. Each phase line is capable of cyclically applying three different negative voltage levels to their respective electrodes. The voltages supplied are: —V1, defined as being greater than the threshold voltage necessary to produce depletion in substrate 20; —V2, defined as being greater than —V1; and —V3, defined as being greater than —V2. The voltages are applied to each phase line in the sequence: —V1, —V3 and —V2 at 120° phase intervals.

Figure 2A:
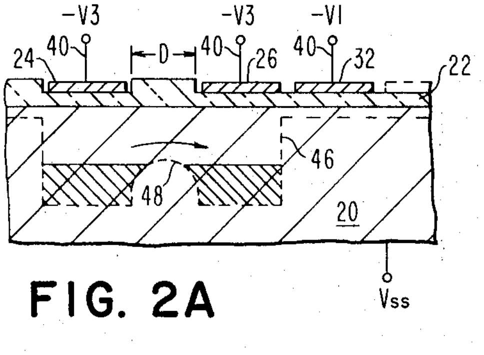
FIGS. 2A and 2B are sectional views of the structure of FIG. 1 taken along the line 2—2 and show the surface potential at two different points in time to illustrate the operation of the device.
Figure 2B:
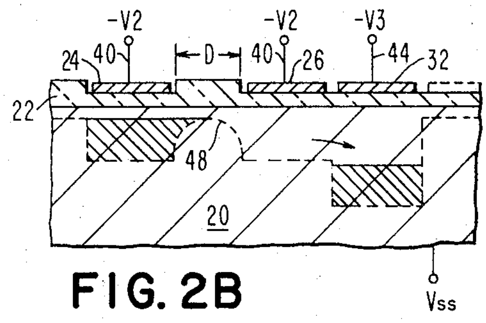

The operation of the AND gate of FIGS. 1 and 2 is described as follows. Logical input data is preferably simultaneously transferred to the AND gate directly from the last field electrodes 28 and 30 of two three-phase charge-coupled device shift registers by techniques well known in the art. Binary data in the form of a charge packet, representing a logical 1, or in the form of no charge, rpresenting a logical 0, is temporarily stored under electrodes 28 and 30 by applying, during a first time period, —V2 to phase line 40. In order to transfer data under electrode 24 —V3 is applied to line 42 creating a potential well under both electrodes 24 and 26. As shown in FIG. 2A the overall shape of the potential well 46 is controlled by the horizontal distance D between electrodes 24 and 26. Distance D is chosen by design to provide a potential spike, or barrier, 48 which acts as a charge transfer path wherein the charge capacity of the potential well formed under electrode 24 is equivalent to that of one charge packet, equivalent to a logical 1. As will be understood by those skilled in the art the potential spike 48 will be created due to the presence and interferences of the respective fields created by spaced electrodes 24 and 26. Since the height of the spike is dependent also on the respective voltages applied to electrodes 24 and 26, its height may also be adjusted by applying different voltages to the electrodes as well as by modifying other parameters of the device. If there is a mobile charge, in the form of holes for the *n*-type semiconductor substrate 20, under either electrode 28 or 30 this charge will move under electrode 24 causing the surface potential under that electrode to rise an amount necessary to compensate for the added charge quantity, potential spike 48 effectively becomes a step. If a second charge quantity is also introduced under electrode 24 simultaneously or during the time a first charge is present, the second charge quantity will be distributed under electrode 26 due to the effective elimination of spike 48. The presence of a charge under electrode 26 represents the output of the logical AND function as it will be present only when logical 1's are introduced by both inputs A and B through electrodes 28 and 30. As shown in FIG. 2B, during a second time period —V2 is applied to phase line 42 while —V3 is applied to line 44 causing any charge present under electrode 26 to be transferred to electrode 32. It will be recognized that as the potential well under electrode 24 and 26 is raised to —V2 the relative height of spike 48 will decrease slightly, a phenomena which should be considered in the initial design of potential spike 48. If there is no charge present under electrode 26, the logical output is 0. During a third time period —V1 is applied to phase line 42 collapsing the potential field under electrodes 24 and 26 causing any charge still remaining under electrode 24 to be dissipated into substrate 20. Alternatively, an additional electrode, not shown, may be placed adjacent to electrode 24 to receive the charge, if any, under electrode 24 which may be then transferred to another device or a drain-like diffusion. A charge subsequently transferred out of the device from the potential well under electrode 24 may also be utilized as a logical OR output.

It will be recognized by those skilled in the art that the input capacity of the AND gate may be increased by proper design of the charge capacity of the potential well under electrode 24. For example, by increasing the area of electrode 24 additional input may be transferred to the AND gate from other input sources such that three or more charges may be applied as inputs. The height of the potential barrier should be adjusted according to the desired output.

Figures 3, 4:
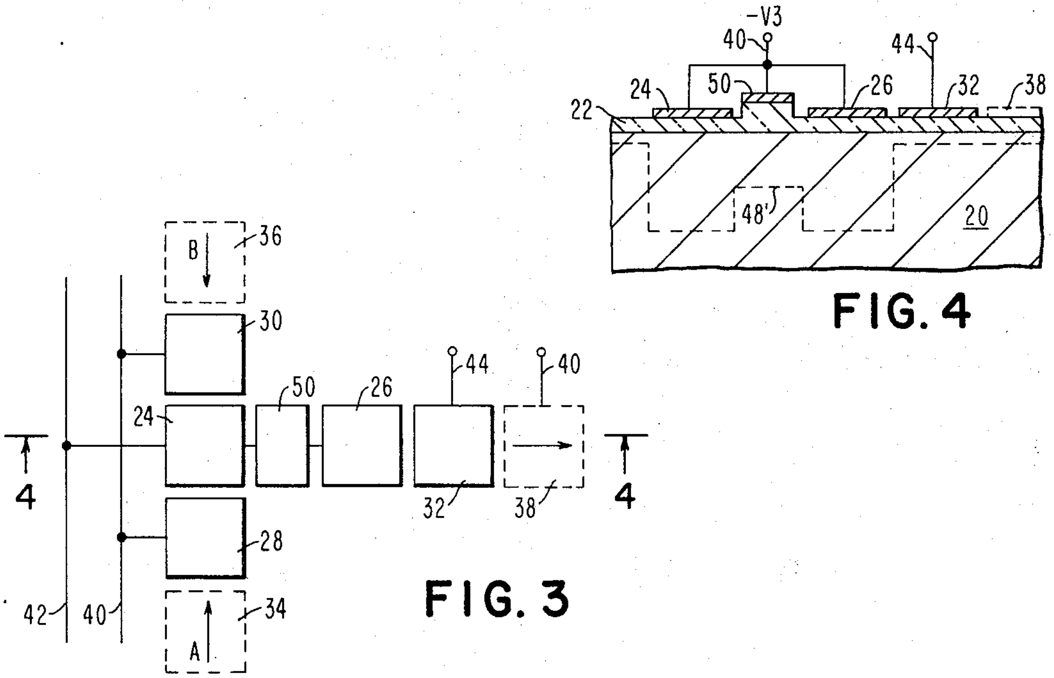
FIG. 3 is a schematic plan view of a modification of the device of FIG. 1 wherein a surface electrode is used to provide the characteristic AND function of the device.
FIG. 4 is a sectional view of the device of FIG. 3 taken along the line 4—4 showing the surface potential provided by the surface electrode pattern.

Referring to FIGS. 3 and 4 there is shown a schematic plan view of a second embodiment of the instant invention as well as a sectional view. Elements corresponding to like elements of FIGS. 1 and 2 have the same reference numbers as in FIGS. 1 and 2. This embodiment is identical to that previously described except that instead of relying on the inherent formation of a charge transfer path by a potential spike due to electrode spacing, or applied potentials, an additional electrode 50 is placed between electrodes 24 and 26. Electrode 50 is for simplicity shown as being electrically connected to electrodes 24 and 26 but may also be connected to a separate phase line in order to more accurately control the height of potential spike 48'. The difference in potential between the region of substrate 20 under electrodes 24 and 26 is achieved in FIGS. 3 and 4 by utilizing a thicker insulating layer under electrode 50. The operation of this embodiment is identical to that previously described with respect to FIGS. 1 and 2.

Figure 5:
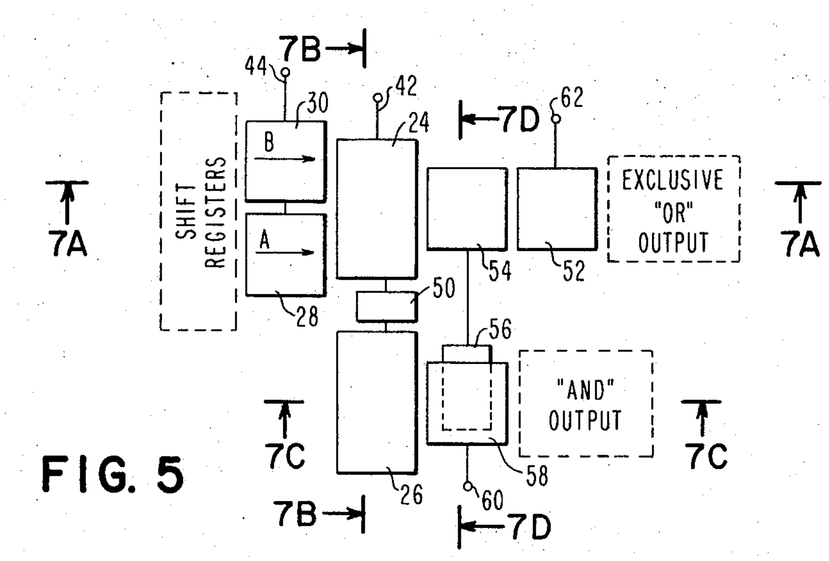
FIG. 5 is a schematic plan view of another modification of the invention showing the electrode pattern and voltage inputs for achieving an Exclusive OR function.
Figure 6:
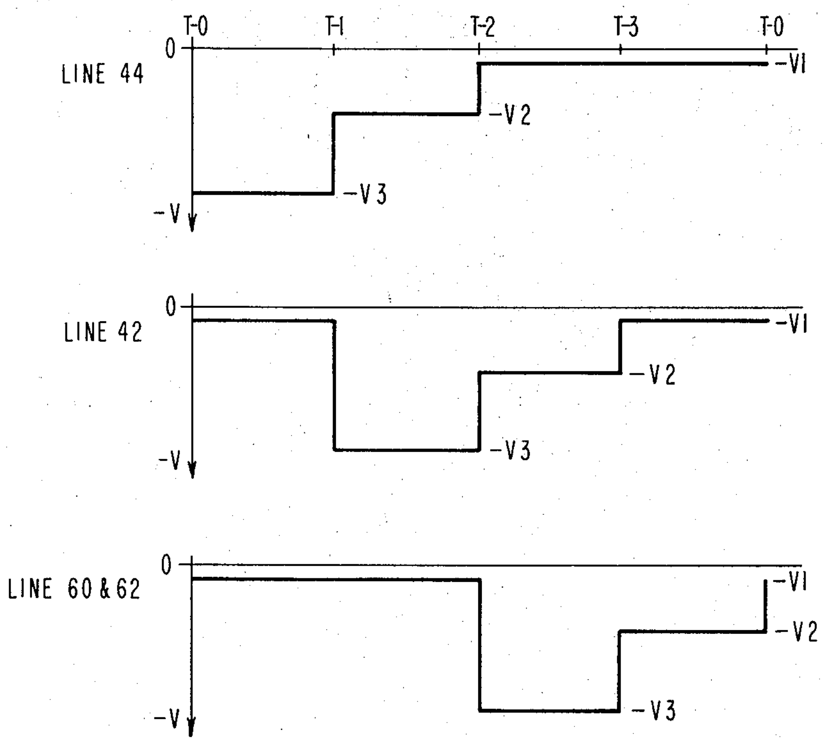
FIG. 6 is a graphical representation of the pulse patterns applied to the electrodes of the device of FIG. 5.

Referring now to FIG. 5, there is shown a schematic plan view of an application of the embodiment of the AND gate of FIGS. 3 and 4 used to create an Exclusive OR gate. Utilizing positive logic, an output of an Exclusive OR gate is required when one and only one of the two inputs is a logical 1. As in the previous embodiments surface field electrodes 28 and 30 represent, for example, the last stage of charge-coupled device shift registers the output of which is to be passed to the Exclusive OR gate. Electrodes 24, 50 and 26 represent an AND gate. An Exclusive OR output electrode 52 is provided and a control electrode 54 which allows a charge to pass from under electrode 24 to electrode 52 only when no AND gate output charges are sensed by sensing electrode 56. Electrode 58 may be used as an additional AND output as well as a means to control sensing electrode 56. Location of typical input and utilization devices are schematically shown for completeness. FIG. 6 shows a typical pulse program suitable for operating the Exclusive OR device of FIG. 5 and is compatible with three-phase shift register operation.

Figures 7A, 7B, 7C, 7D, 8A, 8B, 8C, 8D:
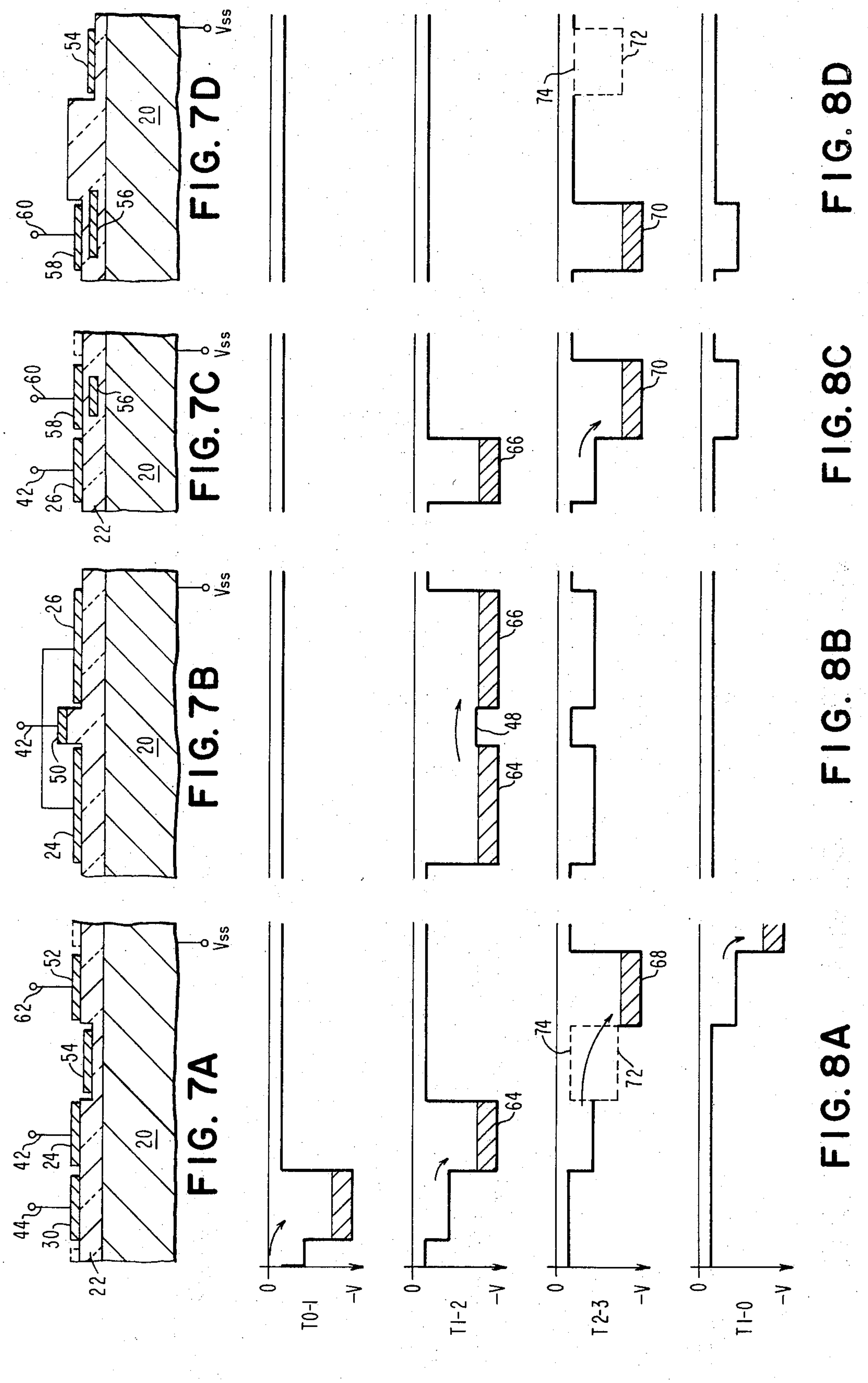
FIGS. 7A, B, C and D are a series of sectional views of the device of FIG. 5 taken along respective lines and show the vertical structure of the device of FIG. 5.
FIGS. 8A, B, C and D are graphical representations of the surface potential of the device of FIG. 5 at various times for the corresponding views of FIG. 7 to explain the operation of that embodiment.

In order to explain the operation of the Exclusive OR gate, reference is made to FIGS. 7 and 8. FIG. 7 shows four different sectional views of the embodiment of FIG. 5 to illustrate the vertical structure of the device. FIG. 8 illustrates the shape of the potential profiles under the various electrodes corresponding to each of the FIGS. 7A, B, C and D in each of the four time periods needed to determine the condition of the output. In FIGS. 8A—D correspond to FIGS. 7A–D, respectively.

Just prior to the time period required for the introduction of data into the Exclusive OR gate, a potential −V3 is applied to the last electrode of an input device to provide a transfer condition in the substrate under that electrode whether or ont a 1 or 0 is present. During the time period from T0 to T1, −V2 is applied to the last electrode of the input devices and −V3 is applied to clock line 44 causing any charge present at the last stage of the input devices to transfer to the potential wells under electrodes 28 and 30. Said data represents inputs A and B. All other clock lines are held at −V1. During the time period T1–T2, −V3 is applied by line 42 to AND gate electrodes 24, 26 and 50. Due to the thicker insulation under electrode 50, the required potential barrier 48 is produced. A charge, if any, under electrodes 28 and 30 will be transferred to the potential well 64 and 66 under electrodes 24 and 26, respectively, to provide the AND gate function shown in FIGS. 8A and B. During the time period T2–T3 the following events occur. Potential −V1 is applied to electrodes 28 and 30 through line 44. Potential −V3 is applied to electrodes 52 and 58 through lines 60 and 62 creating potential wells 68 and 70 under their respective electrodes. If there is no charge present in potential well 64 under electrode 24, no charge will be available to be transferred to potential well 68 under output electrode 52. If either of the A or B inputs are logical 1's, a charge will be present in at least well 64. This charge may, or may not, be transferred to output electrode 52 depending upon whether or not a potential well is created under control electrode 54 which is responsive to the potential taken by sensing electrode 56.

The following will serve to more clearly describe the operation of the sensing and control electrodes. As shown in FIGS. 5, 7C and 7D, sensing electrode 56 is placed at least partially under field electrode 58. Electrode 56 is electrically floating and is insulated from both substrate 20 electrode 58 and due to capacitive coupling will assume a potential some value between the potential applied to line 60 and that applied to substrate, depending upon the exact location of electrode 56 in the structure. If −V3 is applied to electrode 58, sensing electrode 56 will also assume a negative potential assuming substrate potential VSS is equal to zero volts and no charge occupies the potential well 70 under electrode 58. By electrically interconnecting electrodes 54 and 56 and by utilizing a thinner layer of insulation material under control electrode 54, a potential well, indicated by dashed line 72 in FIGS. 8A and D, will be created. However, if a packet of positively charged carriers is present under electrode 58 the surface potential will be raised to a less negative value, in turn causing the potential on electrodes 56 and 54 to rise reducing the potential well under electrode 54 to about −V1, for example, as shown by dashed line 74. As can be seen with reference to FIG. 8, control electrode 54 will allow a charge to pass from under electrode 24 to output electrode 52 only if no charge has been sensed by electrode 56.

Returning now to the description of the operation of the Exclusive OR device, the following input conditions may be present. If neither of the inputs A or B represent logical 1's, that is, charge packets, no charge will be available to be transferred to output electrode 52 and therefore the logical output of the exclusive OR device will be a 0. Additionally, if both inputs A and B represent logical 1's, charge packets will be transferred from electrodes 28 and 30 to electrodes 24 and 26 as previously described with respect to the AND gate during the time period T1–T2. During the next time period T2–T3, although there is a charge available under electrode 24 in potential well 64, a charge also will be transferred as shown FIG. 8C to potential well 70 under electrode 58. This causes the potential on sensing electrode 56 and the potential well under its interconnected control electrode 54 to rise to a level shown in FIG. 8A and D indicated by the line 74 preventing the charge in potential well 64 from passing to electrode 52. During the fourth time period since no charge is passed to the output electrode 52, the logical output will be a 0. However, if either input A or input B, but not both are 1', only a single charge will be transferred during tme period T1–T2. During the next time period since there will be no charge under electrode 26, the potential sensed by electrode 56 will be somewhat negative allowing a depletion region indicated by dashed line 72 to be created under control electrode 54. The presence of this depletion region allows the single charge received by electrode 24 to pass from depletion region 64 to depletion region 68 under output electrode 52 producing the logical 1 output from the Exclusive OR function.

A charge, if any, present under electrode 58 may thereafter be either dissipated or transferred to a utilization device or may be used as the output of an AND gate as shown in FIG. 5.

Figure 9:
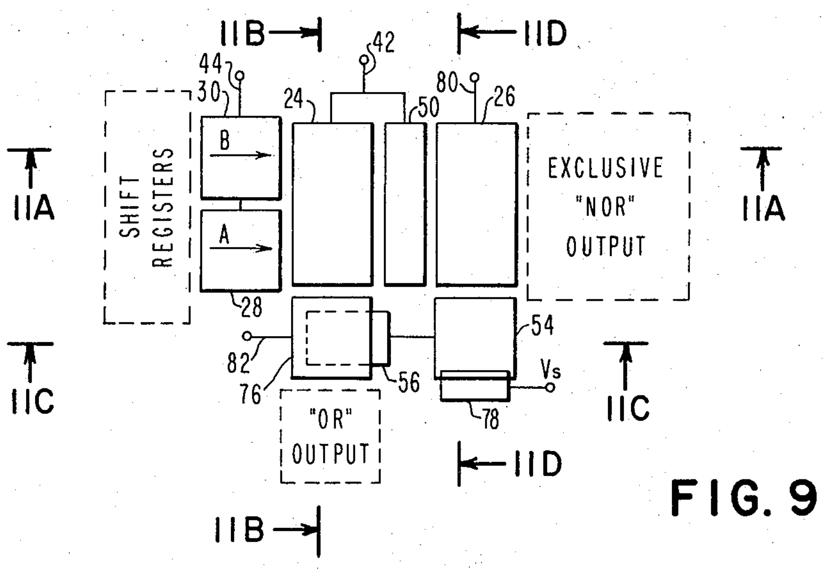
FIG. 9 is a schematic plan view of the electrode pattern of yet another embodiment of the invention useful for performing an exclusive NOR function.

Referring now to FIG. 9 there is shown a schematic plan view of another embodiment of the AND gate of FIGS. 3 and 4 utilized to perform an Exclusive NOR logic function. The exclusive NOR gate presents a logical 1 output only under conditions where both inputs A and B represent the same logical state. That is, when inputs A and B either both are logical 0's or logical 1's. In addition to previously described input electrodes 28 and 30, AND electrodes 24, 26 and 50, sensing electrode 56 and control electrode 54, there is provided in this embodiment a field electrode 76 positioned adjacent to electrode 24 and a charge generating diffusion 78 adjacent to control electrode 54.

Figure 10:
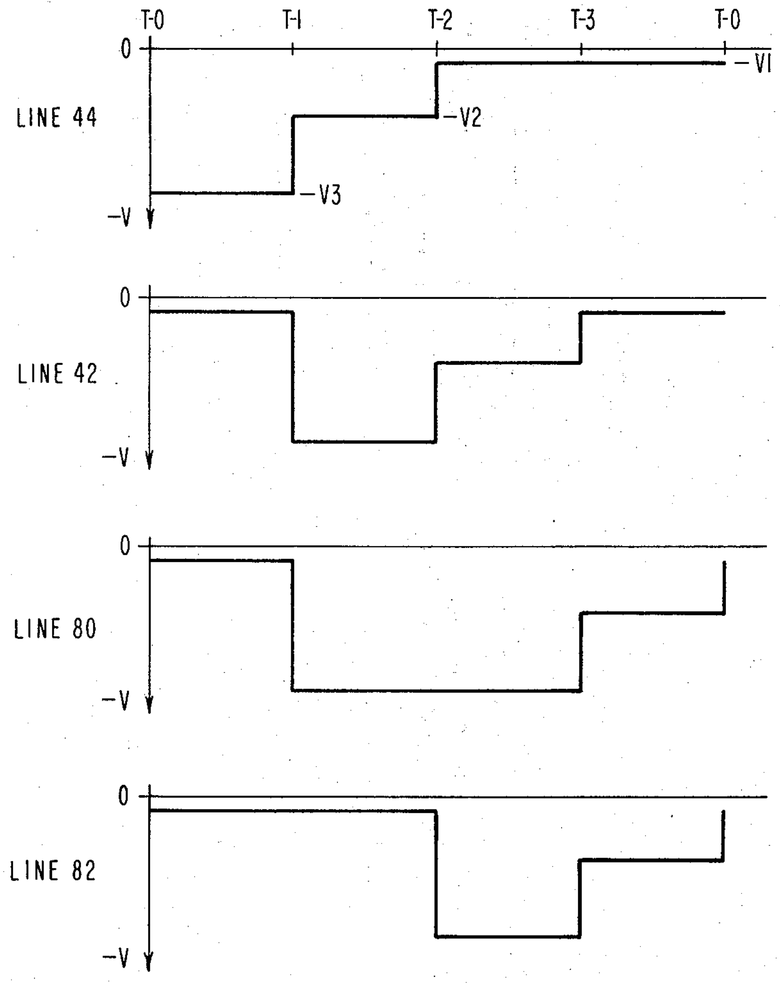
FIG. 10 is a graphical representation of the pulse patterns to be applied to the various electrodes of the device in FIG. 9.

FIG. 10 shows the pulse patterns required to be applied to the electrodes of the Exclusive NOR gate. FIGS. 11 and 12 are similar to FIGS. 7 and 8 and show sectional views of the embodiment of FIG. 9 as well as the surface potential profiles at the various time periods to illustrate more clearly the operation of this embodiment.

During the first two time periods, the Exclusive NOR device functions exactly as the above described Exclusive OR device. That is, data is first transferred from an input device to input electrodes 28 and 30 and thereafter transferred under AND gate electrodes 24 and 26. During the third time period T2–T3 data under electrode 26 is retained by utilizing a separate clockline 80 to maintain potential well 66 at −V3 and data under electrode 24, representing an OR function, is transferred under electrode 76 under control of line 82, as shown in FIGS. 12 B and C. If a charge is sensed by sensing electrode 56 the deletion region under control electrode 54 collapses to a potential 74 preventing any communication between diffused source 78 and electrode 26. Under this condition, if there is no charge already under electrode 26 the output during the time period T3–T0 will be a logical 0.

Figures 11A, 11B, 11C, 11D, 12A, 12B, 12C, 12D:
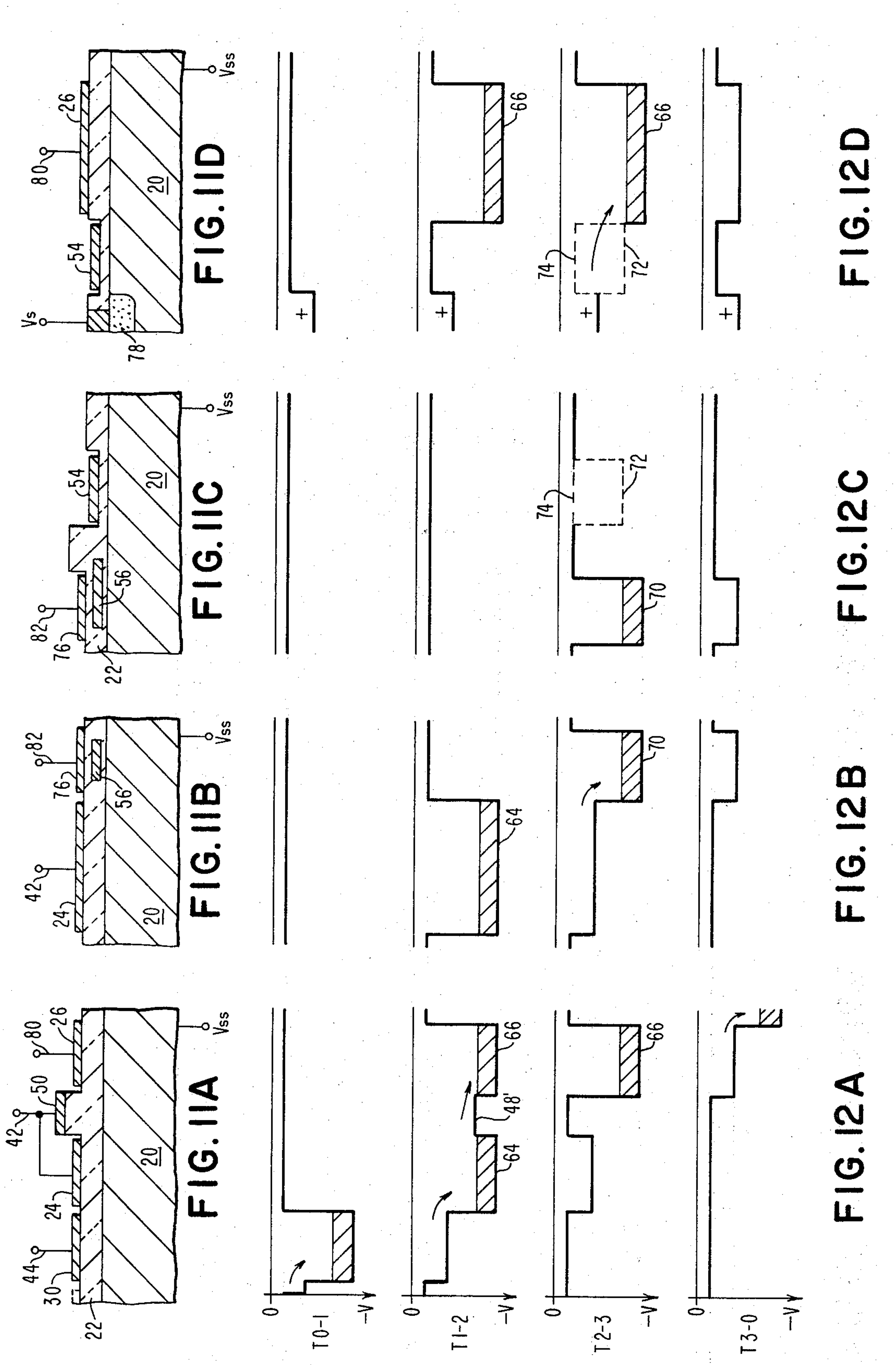
FIGS. 11A, B, C and D show various sections of the logical Exclusive Nor gate of FIG. 9.
FIGS. 12A, B, C and D are graphical representations of the surface potential of the device of FIG. 9 at various times for the corresponding views of FIG. 11.

Diffused source 78 is used as a charge injection device and is maintained at a potential VS equal to approximately −V1. If no charge is sensed under electrode 76 during time period T2–T3 indicating a 0 from both inputs A and B, sensing electrode 56 will apply a negative voltage to control electrode 54 to form potential well 72 which allows a charge to pass from source 78 to potential well 66. This charge represents the desired logical 1 output. When both inputs A and B are logical 1's, no charge is passed by control electrode 54, but the charge already in potential well 66, representing the AND output will be transferred out during time period T3–T0, as shown in FIG. 12A.

It will be understood by those skilled in the art that the sensing and control configuration may be also performed by other embodiments, for example, a sensing diffusion may be utilized in place of sensing electrode 56. In addition various other items may also be modified such as electrode configurations and clockline pulse train levels and timings. It will also be clear that various other logical functions may be achieved utilizing the above described elements.

While the invention has been particularly shown and described with reference to the preferred embodiments thereof, it will be understood by those skilled in the art that the aforegoing and other changes in form and details may be made therein without departing from the spirit and scope of the invention.

What is claimed is:

1. In charge transfer apparatus of the type used for storage and transfer of binary data units in localized potential wells periodically induced in a storage medium, wherein the presence of a packet of charge represents a first logical state and the absence of charge represents a second logical state a logical gate comprising:

first potential inducing means for periodically inducing a first and a second potential well in spaced relation in said storage medium, said potential wells being connected by a charge transfer path capable of allowing charge to transfer from said first potential well to said second potential well during a first time period, said charge transfer path including a potential barrier of less magnitude than said first and second potential wells to provide isolation between said first and second potential wells and to provide said first potential well with a charge capacity equal to at least one packet of charge; and data input means adjacent to said first potential well for periodically allowing the transfer of at least two separate binary data units into said first potential well during said first time period, said charge transfer path allowing the transfer of any quantity of charge in excess of the capacity of said first potential well to be transferred over said potential barrier to said second potential well to provide an isolated charge in said second potential well whenever said data input means provides a quantity of charge, representive of said first logical state, in excess of the capacity of said first potential well.

2. The apparatus of claim 1 further including:

means responsive to the charge condition of said second potential well during a second time period for determining the logical condition of said data input means during said first time period.

3. The apparatus of claim 1 further including:

second potential inducing means adjacent to said second potential well for periodically inducing, during at least a second time period, a third potential well for receiving the charge contents of said second potential well.

4. The apparatus of claim 1 wherein said first potential well has a capacity of N-1 packets of charge, where N is an integer greater than 1, and further wherein said data input means is capable of providing N separate binary data units to said first potential well during said first time period, said apparatus acting as a logical AND gate by providing a charge in said second potential well only when N packets of charge are transferred to said first potential well.

5. The apparatus of claim 1 wherein said first and second potential wells and said charge transfer path are simultaneously created by two spaced electrodes adjacent to the surface of said storage medium.

6. The apparatus of claim 1 wherein said first and second potential wells are induced by application of a first potential to a first and second spaced location on the surface of said storage medium and said charge transfer path is induced by application of a second potential of smaller magnitude than said first potential in a third location intermediate said first and second locations.

7. The apparatus of claim 1 wherein said storage medium is a semiconductor material and said first potential inducing means comprises a metallic electrode having a periodic electrical potential applied thereto, portions of said electrode being spaced from the surface of said semiconductor material by at least two different thicknesses of insulating material.

8. The apparatus of claim 1 including means adjacent to said first potential well for dissipating any charge quantity remaining in said first potential well after said first time period has passed.

9. The apparatus of claim 1 including means adjacent to said first potential well for utilizing any charge present in said first potential well after said first time period has passed as the output of a logical OR function.

10. The apparatus of claim 3 wherein said first potential well has a capacity of one packet of charge and said data input means is capable of allowing the transfer of two separate binary data units said apparatus further including:

charge sensing means in sensing relation to said second potential inducing means for sensing the charge condition of said third potential well;

control means responsive to said charge sensing means for controlling the transfer of charge in said first potential well to an output means, said control means being capable of inducing a potential well sufficient to transfer a packet of charge from said first potential well only when substantially no charge quantity is sensed by said sensing means; and output means adjacent to said control means for inducing a fourth potential well for receiving a transferred charge from said first potential well, said apparatus acting as a logical Exclusive OR gate by providing a charge in said fourth potential well only when a single packet of charge has been transferred to said first potential well during said first time period.

11. The apparatus of claim 10 wherein said sensing means is an electrically floating metallic electrode.

12. The apparatus of claim 10 wherein said storage medium is a semiconductor of a first conductivity type and said sensing means is a diffused semiconductor region of a second conductivity type.

13. The apparatus of claim 1 wherein said first potential well has a capacity of more than one and less than two packets of charge and said data input means is capable of allowing the transfer of two separate binary data units to said first potential well during said first time period, said apparatus further including;

second potential inducing means adjacent to said first potential well for periodically inducing a third potential well for receiving the charge contents of said first potential well;

charge sensing means in sensing relation to said third potential well for sensing the presence of charge in said third potential well;

charge injection means for providing a source of charge; and control means responsive to said charge sensing means, said control means being adjacent to both said charge injection means and said second potential well to control the transfer of charge from said injection means to said second potential well on the condition that substantially no charge is sensed by said sensing means, a charge being available in said second potential well on the condition that no charge has been introduced into said first potential well and on the condition that two charges have been introduced into said first potential well, said apparatus providing a charge in said second potential well representative of the output of a logical Exclusive NOR gate.

* * * * *